United States Patent
Maruhashi et al.

(10) Patent No.: US 8,526,878 B2
(45) Date of Patent: Sep. 3, 2013

(54) CONTROL METHOD OF WIRELESS COMMUNICATION SYSTEM, WIRELESS COMMUNICATION SYSTEM, TRANSMITTING APPARATUS, AND RECEIVING APPARATUS

(75) Inventors: Kenichi Maruhashi, Tokyo (JP); Naoyuki Orihashi, Tokyo (JP); Kenichi Hosoya, Tokyo (JP)

(73) Assignee: NEC Corporation, Tokyo (JP)

( * ) Notice: Subject to any disclaimer, the term of this patent is extended or adjusted under 35 U.S.C. 154(b) by 340 days.

(21) Appl. No.: 13/003,653

(22) PCT Filed: May 13, 2009

(86) PCT No.: PCT/JP2009/002089
§ 371 (c)(1),
(2), (4) Date: Jan. 11, 2011

(87) PCT Pub. No.: WO2010/007717
PCT Pub. Date: Jan. 21, 2010

(65) Prior Publication Data
US 2011/0105032 A1    May 5, 2011

(30) Foreign Application Priority Data
Jul. 16, 2008    (JP) .................... 2008-184405

(51) Int. Cl.
*H04B 7/24*    (2006.01)
(52) U.S. Cl.
USPC ................ 455/39; 370/310; 455/69; 455/59; 375/267
(58) Field of Classification Search
USPC ........................................................ 455/39
See application file for complete search history.

(56) References Cited

U.S. PATENT DOCUMENTS

| 6,058,105 | A | * | 5/2000 | Hochwald et al. ............ 370/310 |
| 7,164,932 | B1 | | 1/2007 | Sato et al. |

(Continued)

FOREIGN PATENT DOCUMENTS

| JP | 2000-165959 A | 6/2000 |
| JP | 2003-258770 A | 9/2003 |

(Continued)

OTHER PUBLICATIONS

Ryoichi Takemoto et al., Eigenvector Mismatch Problem and Its Countermeasure for MIMO MRC Transmission—In the Case of Inter-Vehicle Communications at 60GHz-, Technical Report of IEICE, 2004, pp. 81-86, vol. 103, No. 681.

(Continued)

*Primary Examiner* — Andrew Wendell
*Assistant Examiner* — David Bilodeau
(74) *Attorney, Agent, or Firm* — Foley & Lardner LLP

(57) ABSTRACT

A channel response matrix is obtained by performing a training process between a transmitter 401 and a receiver 402 to obtain optimal signal phases of the antenna array. Next, a singular-value decomposition (SVD) process is performed to decompose the channel response matrix into a correlation matrix and eigenvalues. Next, a diagonal matrix having square roots of the eigenvalues as its components is obtained. Next, all but one of diagonal components included in the diagonal matrix are replaced with zeros, and optimal setting of the amplitudes and phases of signals to be applied to the antenna array (antenna weight vector) for use in wireless communication between the transmitter and the receiver is obtained based on a channel response matrix that is reconstructed by using the component-replaced diagonal matrix. In this way, when wireless communication is implemented by performing beam forming, the time necessary to find and set a beam direction can be reduced.

13 Claims, 9 Drawing Sheets

(56) References Cited

U.S. PATENT DOCUMENTS

| | | | |
|---|---|---|---|
| 7,248,638 B1* | 7/2007 | Banister | 375/267 |
| 7,817,741 B2 | 10/2010 | Hayase et al. | |
| 2003/0058153 A1* | 3/2003 | Yu | 342/17 |
| 2005/0101259 A1* | 5/2005 | Tong et al. | 455/69 |
| 2007/0191067 A1* | 8/2007 | Nguyen et al. | 455/562.1 |
| 2007/0205943 A1 | 9/2007 | Nassiri-Toussi et al. | |
| 2009/0207765 A1* | 8/2009 | Yamaura | 370/310 |
| 2011/0033005 A1 | 2/2011 | Hayase et al. | |

FOREIGN PATENT DOCUMENTS

| | | |
|---|---|---|
| JP | 2006-245986 A | 9/2006 |
| JP | 2007306446 A | 11/2007 |
| WO | WO 2006/138555 A2 | 12/2006 |
| WO | WO 2007/095354 A2 | 8/2007 |

OTHER PUBLICATIONS

Huai-Rong Shao et al., Adaptive Multi-beam Transmission of Uncmpressed Video Over 60GHz Wireless Systems, Future Generation Communication and Networking, 2007, 6 pages.

Kenichi Maruhashi et al., 60-GHz-band LTCC Module Technology for Wireless Gigabit Transceiver Applications, IEEE International Workshop on Radio-Frequency Integration Technology, 2005, pp. 131-134.

Keiichi Ohata et al., 1.25Gbps Wireless Gigabit Ethernet Link at 60GHz-Band, IEEE MTT-S Digest, 2003, pp. 373-376.

James F. Buckwalter et al., An Integrated Subharmonic Coupled-Oscillator Scheme for a 60-GHz Phased-Array Transmitter, IEEE Transaction on Microwave Theory and Techniques, Dec. 2006, pp. 4271-4280, vol. 54, No. 12.

Sayf Alalusi et al., A 60GHz Phased Array in CMOS, IEEE Custom Integrated Circuits Conference (CICC), 2006, pp. 393-396.

International Telecommunications Union, Propagation Data and Prediction Methods for the Planning of Indoor Radio Communication Systems and Radio Local Area Networks in the Frequency Range 900 MHz to 100 GHz, Recommendation ITU-R,P.1238.2, Apr. 2003, 17 pages.

* cited by examiner

CONTROL METHOD OF WIRELESS COMMUNICATION SYSTEM, WIRELESS COMMUNICATION SYSTEM, TRANSMITTING APPARATUS, AND RECEIVING APPARATUS

This application is the National Phase of PCT/JP2009/002089, filed May, 13, 2009, which claims priority to Japanese Application No. 2008-184405, filed Jul. 16, 2008, the disclosures of which are hereby incorporated by reference in their entirety.

TECHNICAL FIELD

The present invention relates to a technical field of wireless communication in which wireless communication is implemented by using radio beams that are set based on the communication quality.

BACKGROUND ART

In recent years, wireless devices using wide-band millimeter waves (30 GHz to 300 GHz) have become widespread. The millimeter-wave radio technology has been expected to be especially applicable to Gigabit-class high-rate radio data communication such as radio transmission of high-resolution images (for example, see Non-patent literatures 1 and 2).

However, the millimeter waves, which have high frequencies, have a high rectilinear propagation property, and thus raising a problem when radio transmission is to be implemented indoors. In addition to having the high rectilinear propagation property, the millimeter-wave signals are significantly attenuated by a human body or other objects. Therefore, when a person stands between the transmitter and the receiver in a room or the like, it is impossible to obtain an unobstructed view, thus making the transmission very difficult (shadowing problem). Since this problem is caused as a result of the higher rectilinear propagation property of radio waves resulting from the use of higher frequencies as well as the change in the propagation environments, the problem is not limited to the millimeter wave band (30 GHz and above). Although it is not easy to clearly specify the transition frequency, it has been said to be around 10 GHz. Meanwhile, according to recommendations of the International Telecommunications Union ("Propagation data and prediction methods for the planning of indoor radio communication systems and radio local area networks in the frequency range 900 MHz to 100 GHz," ITU-R, P.1238-3, April, 2003), the power loss coefficient, which indicates the attenuation amount of a radio wave with respect to the propagation distance, is 22 for 60 GHz in an office, while it is 28 to 32 for 0.9 to 5.2 GHz. Considering that it is 20 in the case of free-space loss, the effects of scattering, diffraction, and the like are considered to be small for high frequencies in the order of 60 GHz.

To solve the problem described above, for example, Patent literature 1 discloses a system in which more than one transmission path is provided by installing a plurality of receiving units in the receiving device, so that when one of the transmission paths between the transmitting device and the receiving units is blocked, the transmission is performed by another transmission path. Furthermore, as another method for solving the problem, Patent literature 2 discloses an invention to secure plural transmission paths by installing reflectors on walls and a ceiling.

In the method disclosed in Patent literature 1, it is very difficult to continue the communication when the area at and around the transmitting device is shielded or when all of the installed receiving units are shielded. Meanwhile, the method disclosed in Patent literature 2 requires the user to take the trouble to install the reflectors with consideration given to the positions of the transmitter and the receiver and the like.

However, recent studies on the propagation properties of millimeter waves have found out that there is a possibility that reflected waves can be utilized without intentionally installing the reflectors. FIG. 9 is a schematic diagram of a communication system using a millimeter wave band. Each of a transmitter 91 and a receiver 92 has a wide-angle antenna. FIG. 10 shows an example of a delay profile of the system using the wide-angle antennas shown in FIG. 9 when the system is used indoors. In the system using the wide-angle antennas shown in FIG. 9, the received power of the dominant wave, which is arrives faster than any other waves, is larger than that of any other waves as shown in FIG. 10. After that, although delayed waves such as the second and third waves arrive, the received power of these waves is smaller than that of the dominant wave. These second and third waves are reflected waves from the ceiling and the walls. This situation is remarkably different from the propagation environment of radio waves having a lower rectilinear propagation property, such as 2.4 GHz band used in wireless LANs (Local Area Networks). In 2.4 GHz band, it is very difficult to clearly separate waves in their directions of Arrival because of the effects of diffraction and multiple reflections. In contrast to this, in the millimeter waves having a high rectilinear propagation property, although radio waves are relatively clearly distinguished in their directions of Arrival, the number of delayed waves is limited and the received-signal level of the delayed waves is relatively small.

Therefore, in communication systems using a frequency band around or higher than 10 GHz such as millimeter waves, when the direct wave (dominant wave) is shielded, the receiver must point a narrow beam having a high directive gain to the direction of Arrival of a reflected wave to ensure a sufficient received-signal level so that the transmission can be continued by using the reflected wave. However, in order to eliminate the necessity for the user to take the trouble in regard to the relative positions of the transmitter and receiver, and the like, the beam forming technology capable of dynamically controlling the direction of a narrow beam is indispensable.

In the beam forming, it is necessary to construct an antenna array. For millimeter waves having a short wavelength (e.g., 5 mm in the case of frequency of 60 GHz), the antenna array can be implemented in a small area. Phase shifter arrays and oscillator arrays for use in such antenna arrays for millimeter waves have been developed (for example, see Non-patent literatures 3 and 4).

CITATION LIST

Patent Literature

Patent Literature 1: Japanese Unexamined Patent Application Publication No. 2006-245986
Patent Literature 2: Japanese Unexamined Patent Application Publication No. 2000-165959
Patent Literature 3: US Patent Publication No. 2007/0205943

Non Patent Literature

Non Patent Literature 1: K. Maruhashi et al., "60-GHz-band LTCC Module Technology for Wireless Gigabit Transceiver Applications", IEEE International Workshop on Radio-Frequency Integration Technology, Digest, pp. 131-134, December 2005.

Non Patent Literature 2: K. Ohata et al., "1.25 Gbps Wireless Gigabit Ethernet Link at 60 GHz-Band", IEEE MTT-S International Microwave Symposium, Digest, pp. 373-376, June 2003.

Non Patent Literature 3: J. F. Buckwalter et al., "An Injected Subharmonic Coupled-Oscillator Scheme for a 60-GHz Phased-Array Transmitter", IEEE Transactions on Microwave Theory and Techniques, Vol. 12, pp. 4271-4280, December 2006.

Non Patent Literature 4: S. Alausi et al., "A 60 GHz Phased Array in CMOS", IEEE 2006 Custom Integrated Circuits Conference, Digest, pp. 393-396, San Jose, September 2006.

SUMMARY OF INVENTION

Technical Problem

In indoor millimeter-wave communication systems, the following problem arises when the direct wave is shielded and the radio transmission is to be continued by using a reflected wave.

When the wave to be used (direct wave, reflected wave) is switched, it is desirable to minimize the time during which the transmission is disconnected. The reduction of the time during which the transmission is disconnected becomes an important requirement especially in the transmission of non-compressed images, for example, in which the real-time capability is indispensable. Meanwhile, in order to perform communication by using a reflected wave, it is necessary to increase the directive gain of the antenna, and thereby to increase the received signal strength by narrowing the width of the antenna beam.

However, the number of directions (the number of steps) in which the search needs to be performed increases as the beam width becomes narrower. Therefore, the time necessary to find and set the beam direction with which the incoming wave is effectively received becomes longer, and therefore transmission-disconnected time also becomes longer. Note that even in the case of apparatuses capable of temporally storing received data, it is still undesirable in practice because it requires a huge buffer memory to cope with a long transmission-disconnected time. Accordingly, it has been desired to develop a beam direction setting method that can shorten the transmission-disconnected time when the direct wave is shielded and the radio transmission is to be continued by using a reflected wave.

FIG. 4 shows a configuration of an apparatus used in a beam forming. Note that circuits that are inessential for the explanation of the operation are omitted in the figure. A transmitter 401 has a transmitting antenna array including m antenna elements 405-1 to 405-m. A receiver 402 has a receiving antenna array including n antenna elements 411-1 to 411-n. A transmitting circuit 403 included in the transmitter 401 receives transmission data from the outside of the circuit. The output of the transmitting circuit 403 is branched into m signals, and they are input to the respective amplitude/phase variable circuits 404-1 to 404-m. The respective signals input to the amplitude/phase variable circuits 404-1 to 404-m are changed in their phases, and eventually output from the transmitting antenna array composed of the antenna elements 405-1 to 405-m. Furthermore, a processing/arithmetic circuit 406 provides instructions on the phase combination of the amplitude/phase variable circuits 404-1 to 404-m through a control circuit 407. With the phase change given to each signal, it is possible to control the direction, the width, and the like of the beam emitted from the transmitter 401. Meanwhile, the receiver 402 has the reversed configuration to that of the transmitter 401. That is, signals received by the receiving antenna array composed of the antenna elements 411-1 to 411-n are adjusted in their phases in amplitude/phase variable circuits 410-1 to 410-n, and then combined. A receiving circuit 409 demodulates the combined signal, and externally outputs the received data. Similarly to the processing/arithmetic circuit 406 in the transmitter 401, a processing/arithmetic circuit 412 controls the amplitude/phase given to each signal in the amplitude/phase variable circuits 410-1 to 410-n. Note that the amplitude/phase variable circuit is used to control the amplitude and the phase of a signal that passes through the circuit.

FIG. 5 is a conceptual diagram for illustrating signal states of the transmitter 401 and the receiver 402 shown in FIG. 4. The transmitter 401 and the receiver 402 are linked through a MIMO (Multi-Input Multi-Output) channel response matrix. It has been known that if this channel response matrix is obtained, the optimal setting of the amplitude and phase of a signal to be applied to the antenna array of the transmitter-and-receiver (hereinafter called "antenna weight vector") can be obtained by using SVD (Singular-value Decomposition). However, on the other hand, since SVD is complex and requires a long processing time, for example, it is practically impossible to implement SVD for a non-compressed image transmission apparatus in which the real-time capability is indispensable.

In order to reduce the time necessary to determine the antenna weight vector applied to the transmitter and the receiver, Patent literature 3, for example, discloses a method for obtaining the optimal phase at which the signal strength is maximized by adding a unitary matrix (e.g., Hadamard matrix) as phases of the antenna array and repeating the training of the antenna array of the transmitter and the training of the antenna array of the receiver. Although this method can reduce the necessary time in comparison to SVD, it still requires a long time to obtain the optimal antenna weight vector because the method repeatedly performs the switching between the transmission and reception.

In particular, in a case where a link needs to be re-established when disconnection of the transmission occurs in the previously-established link, it is necessary to find another optimal antenna weight vector in a shorter time in comparison to the initial link establishment. Furthermore, in the case of multipoint communication, it is also necessary to find the optimal antenna weight vector in a short time because it requires the re-establishment of multiple links.

The present invention has been made in view of the above-described problems, and an object thereof is to provide a radio control method capable of, when wireless communication is implemented by performing beam forming, reducing the time necessary to find and set a beam direction and thereby reducing the time during which the transmission is disconnected.

Solution to Problem

A method according to a first exemplary aspect of the present invention is a method of controlling a wireless communication system which includes a transmitter having a transmitting antenna array and a receiver having a receiving antenna array. The control method includes the following processes (a) to (d) that are performed when amplitudes and phases of signals to be transmitted from at least two antenna elements among a plurality of antenna elements constituting the transmitting antenna array are independently controlled and amplitudes and phases of signals to be received at least two antenna elements among a plurality of antenna elements constituting the receiving antenna array are independently controlled, the processes (a) to (d) being:

(a) obtaining a channel response matrix by performing a training process to obtain an optimal signal phase of the antenna array at least between the transmitter and the receiver;

(b) performing singular-value decomposition process to decompose the channel response matrix into a correlation matrix and eigenvalues;

(c) obtaining a diagonal matrix having square roots of the eigenvalues obtained in the singular-value decomposition process as its components; and (d) replacing all but one of diagonal components included in the diagonal matrix with zeros, and obtaining an antenna weight vector to be applied to the antenna array having optimal communication quality for use in wireless communication between the transmitter and the receiver based on a channel response matrix reconstructed by using the component-replaced diagonal matrix.

A wireless communication system according to second exemplary aspect of the invention includes a transmitter and a receiver. The transmitter includes a transmitting antenna array having a plurality of transmitting antennal components, and is configured to independently control amplitudes and phases of transmission signals to be transmitted from at least two transmitting antenna elements among the plurality of antenna elements. Furthermore, the receiver includes a receiving antenna array having a plurality of receiving antennal components, and is configured to independently control amplitudes and phases of received signals to be received at least two receiving antenna elements among the plurality of antenna elements.

The transmitter and the receiver are configured so as to perform an amplitude/phase control process of the transmitting and receiving antenna arrays in cooperation. Note that the amplitude/phase control process includes the following steps (a) to (e):

(a) obtaining a channel response matrix by performing a training process between the transmitter and the receiver;

(b) performing singular value decomposition to decompose the channel response matrix into a correlation matrix and eigenvalues;

(c) obtaining a diagonal matrix having square roots of the eigenvalues obtained in the singular-value decomposition as its components;

(d) obtaining an antenna weight vector to be applied to the antenna array having optimal communication quality for use in wireless communication between the transmitter and the receiver based on a channel response matrix reconstructed by using a component-replaced diagonal matrix, the component-replaced diagonal matrix being obtained by replacing all but one of diagonal components included in the diagonal matrix with zeros; and (e) controlling amplitudes and phases of the transmission signals and received signals in accordance with the antenna weight vector.

A transmitting apparatus according to third exemplary aspect of the invention includes a transmitting antenna array and a control unit. The transmitting antenna array includes a plurality of antenna elements. Further, the control unit changes a beam direction of the transmitting antenna array by controlling amplitudes and phases of signals to be transmitted from at least two antenna elements among the plurality of transmitting antenna elements.

Furthermore, the control unit adjusts the beam direction by supplying one antenna weight vector selected from a plurality of antenna weight vectors to the transmitting antenna array, and performs control such that the antenna weight vector to be supplied to the transmitting antenna array is switched to a different one of the plurality of antenna weight vectors in response to deterioration in communication quality with a receiving apparatus. Note that each of the plurality of antenna weight vectors corresponds to one of a plurality of eigenpaths of a radio transmission path between the transmitting apparatus and the receiving apparatus, the plurality of eigenpaths being obtained by performing a singular-value decomposition of a channel response matrix with regard to the radio transmission path.

A receiving apparatus according to fourth exemplary aspect of the invention includes a receiving antenna array and a control unit. The receiving antenna array includes a plurality of antenna elements. Further, the control unit changes a beam direction of the receiving antenna array by controlling amplitudes and phases of signals to be received by at least two antenna elements among the plurality of antenna elements.

Furthermore, the control unit adjusts the beam direction by supplying one antenna weight vector selected from a plurality of antenna weight vectors to the receiving antenna array, and performs control such that a phase combination to be supplied to the receiving antenna array is switched to a different one of the plurality of phase combinations in response to deterioration in communication quality with a transmitting apparatus. Note that each of the plurality of antenna weight vectors corresponds to one of a plurality of eigenpaths of a radio transmission path between the transmitting apparatus and the receiving apparatus, the plurality of eigenpaths being obtained by performing a singular-value decomposition of a channel response matrix with regard to the radio transmission path.

Advantageous Effects of Invention

In accordance with each of the above-described exemplary aspects of the present invention, when wireless communication is implemented by performing beam forming, it becomes possible to find and set a beam direction having excellent communication quality in a short time.

DESCRIPTION OF EMBODIMENTS

First Exemplary Embodiment

Figure 4:
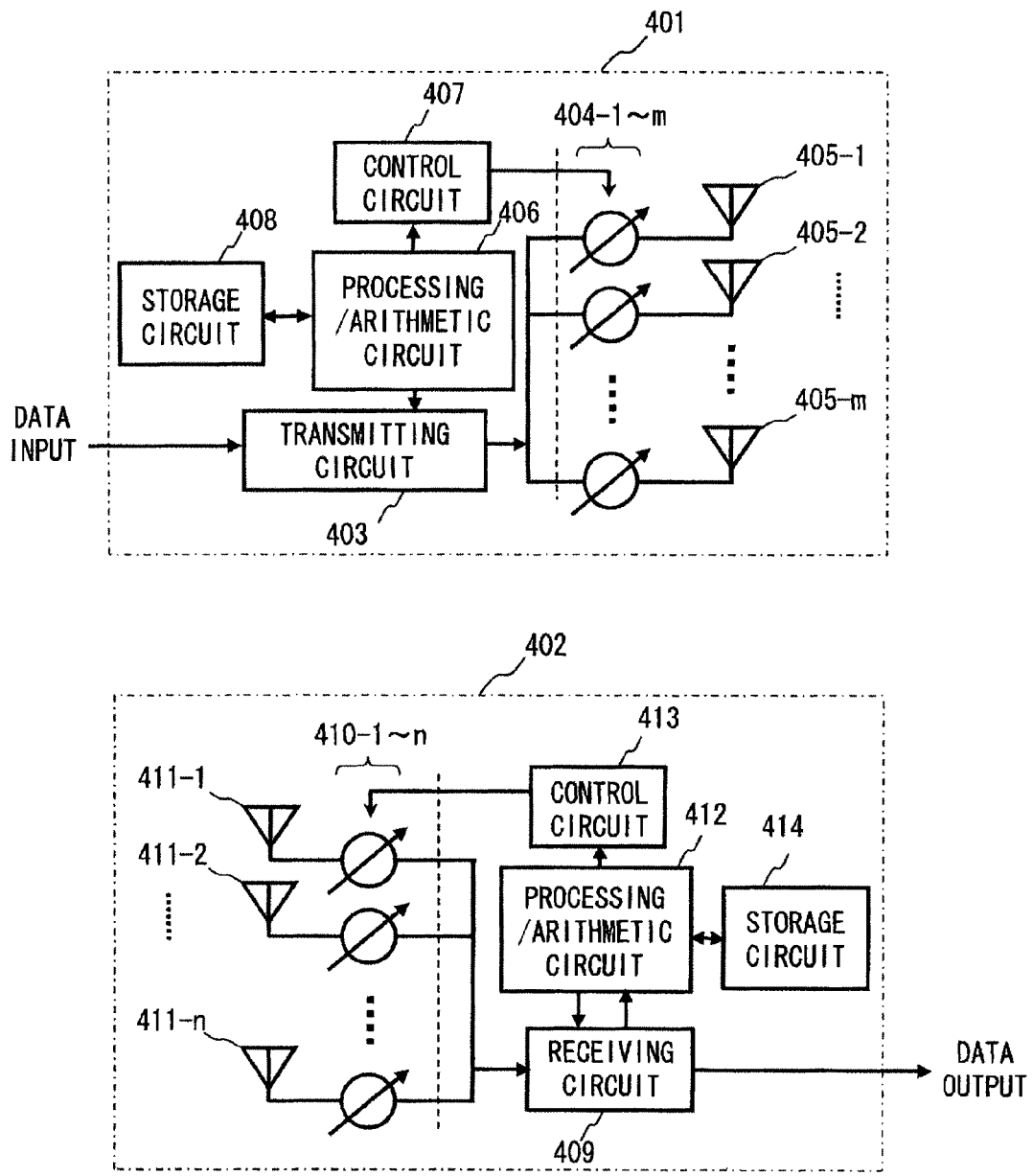
FIG. 4 shows an example of a device configuration used in beam forming to which the present invention can be applied.

A first exemplary embodiment of the present invention is explained with reference to a transition diagram shown in FIG. 1. Note that the wireless communication system in accordance with this exemplary embodiment may employ a similar configuration to that shown in FIG. 4. In S12, a transmitter 401 and a receiver 402 perform an initial training in order to optimize amplitude/phase variable circuits 404-1 to 404-$m$ and 410-1 to 410-$n$ provided in the transmitter 401 and receiver 402. In S13, a processing/arithmetic circuit 406 or 412, or both of them in cooperation calculate a plurality of candidate antenna weight vectors. The calculation method for the plurality of candidate antenna weight vectors in S13 is described later. The obtained plurality of candidate antenna weight vectors are recorded as a data string in storage circuits 408 and 414.

In S14, one candidate is selected from the plurality of candidate phase combination obtained in S13 to perform communication. In this process, it is preferable to select a candidate antenna weight vector that is expected to provide the best communication quality. the receiver 402 and the transmitter 401 monitor the communication state while communicating. The monitoring of the communication state by the receiver 402 may be implemented by measuring the communication quality by the receiving circuit 409 or the processing/arithmetic circuit 412. For example, communication quality such as a received-signal level, an SNR (Signal to Noise Ratio), a BER (Bit Error Rate), a PER (Packet Error Rate), and a FER (Frame Error Rate) may be measured. Meanwhile, the monitoring of the communication state by the transmitter 401 may be implemented by measuring the reception state of a communication quality deterioration alert or the reception state of a reception acknowledgement response (ACK) transmitted from the receiver 402. Note that since publicly-known common techniques may be employed for the actual technique for monitoring the communication state, detailed explanation of the monitoring technique in this exemplary embodiment is omitted.

When deterioration in the communication quality such as disconnected communication is detected while the communication is continued, the transmitter 401 and receiver 402 select another antenna weight vector from the data string recorded in the storage circuit 408 or 414 (S15).

In S16, it is determined whether the quality of the communication using the newly selected antenna weight vector is satisfactory or not. For example, the pass/fail of the communication quality may be determined by measuring a received-signal level, an SNR, or the like in the receiving circuit 409 or the processing/arithmetic circuit 412 included in the receiver 402. When the communication quality is determined to be satisfactory in S16, the transmitter 401 and receiver 402 return to the communication state (S12). On the other hand, when the communication quality is determined to be unsatisfactory in S16, the transmitter 401 and receiver 402 transit to S16 to select another antenna weight vector again.

When no antenna weight vector with which a satisfactory communication state is achieved is found from the antenna weight vectors recorded in the storage circuits 408 and 414, the process returns to the initial training (S12) and is repeated from there.

Figure 1:
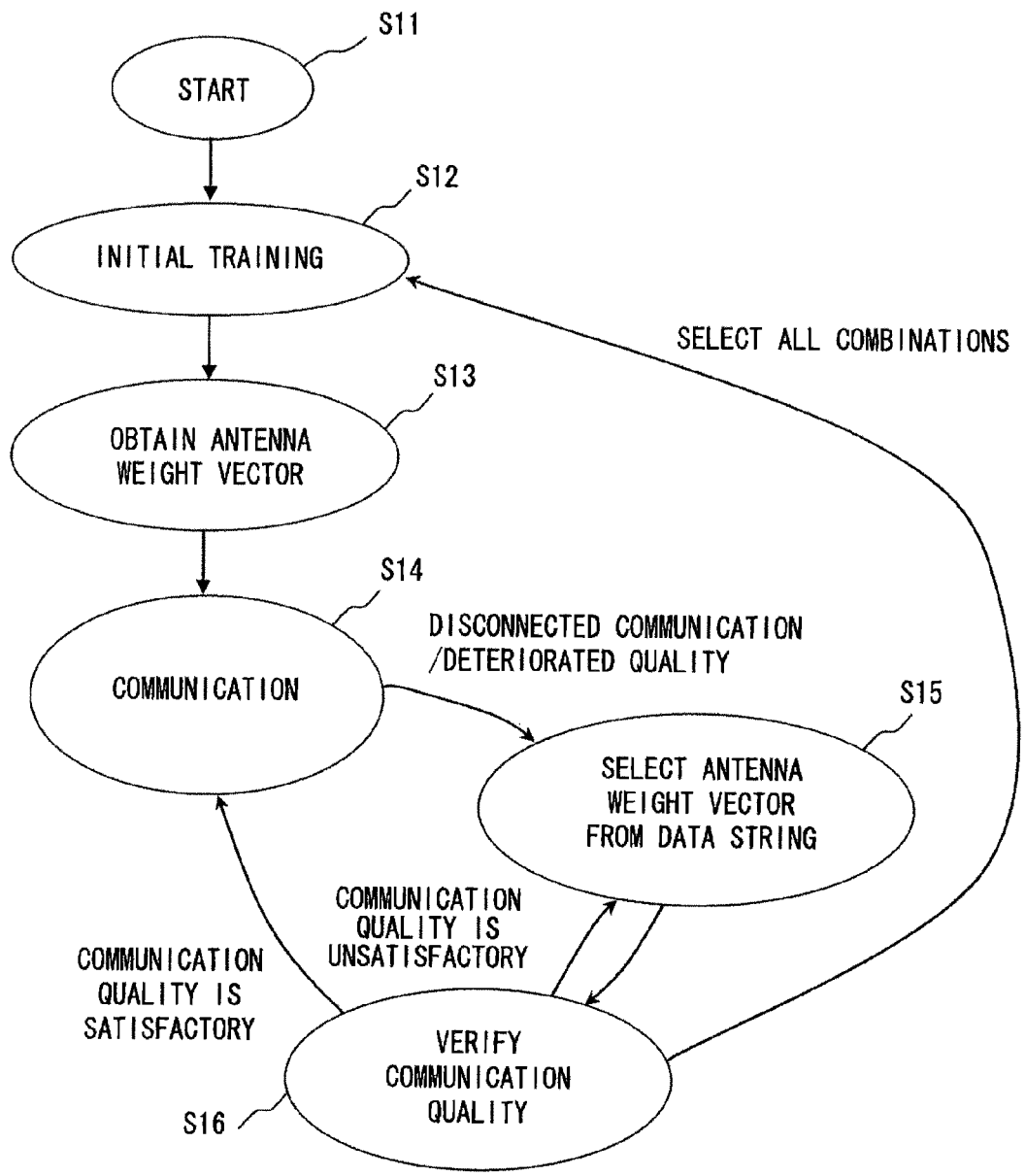
FIG. 1 shows transitions in a radio control procedure in accordance with a first exemplary embodiment of the present invention.

Next, a calculation procedure for a plurality of candidate antenna weight vectors in S13 of FIG. 1 is explained hereinafter. For the calculation of candidate antenna weight vectors, a MIMO channel response matrix A is obtained by using a result of the initial training in S12. The channel response matrix is expressed by the following Formula (1).

$$A = \begin{bmatrix} a_{11} & a_{12} & \cdots & a_{1m} \\ a_{21} & a_{22} & \cdots & a_{2m} \\ \vdots & \vdots & \ddots & \vdots \\ a_{n1} & a_{n2} & \cdots & a_{nm} \end{bmatrix} \quad (1)$$

A component $A_{ij}$ of the channel response matrix A represents the response of a signal that is transmitted from ith antenna 405-$i$ of the transmitter 401 and received by jth antenna 411-$j$ of the receiver 402. Further, the channel response matrix A is m×n matrix where m is the number of antenna elements included in the transmitter antenna array and n is the number of antenna elements included in the receiver antenna array. The channel response matrix A may be obtained, for example, by using the method disclosed in Patent literature 3. Alternatively, the channel response matrix A may be obtained by applying columns of a unitary matrix in succession to an antenna weight vector while transmitting a signal for training.

In this exemplary embodiment, a transmission signal vector T and a received signal vector R are expressed by the following Formulas (2) and (3).

$$T = \begin{bmatrix} t_1 \\ t_2 \\ \vdots \\ t_m \end{bmatrix} \quad (2)$$

$$R = \begin{bmatrix} r_1 \\ r_2 \\ \vdots \\ r_n \end{bmatrix} \quad (3)$$

Figure 5:
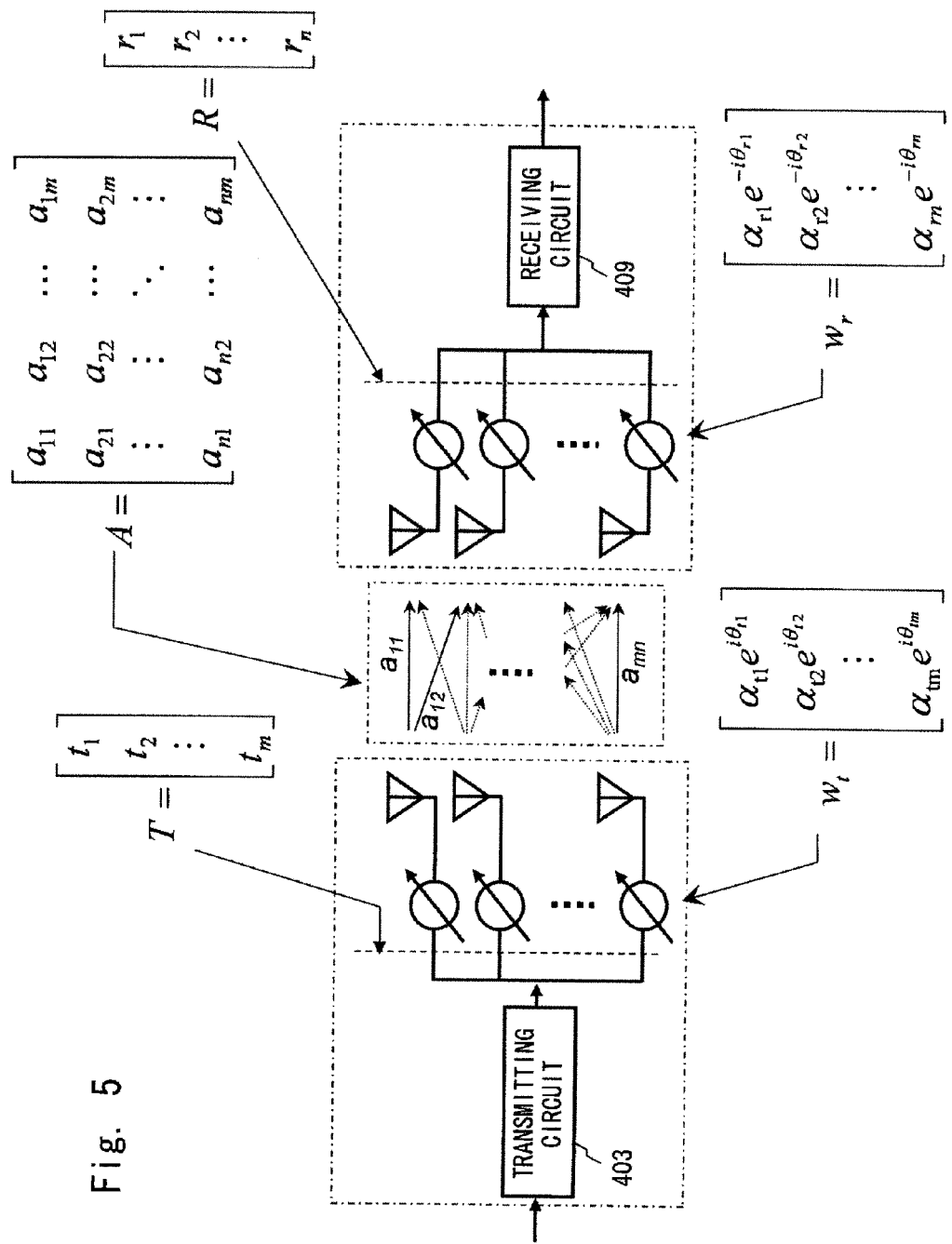
FIG. 5 is a schematic diagram for illustrating states of a radio signal between a transmitter and a receiver.

In Formulas, a component $t_i$ of the transmission signal vector T represents the input signal of ith amplitude/phase variable circuit 404-$i$. Further, a component $r_i$ of the received signal vector R represents the output signal of ith amplitude/phase variable circuit 410-$i$. In the configuration example shown in FIGS. 4 and 5, since the signal from the transmitting circuit 403 is equally branched into the amplitude/phase variable circuits 404-1 to 404-$m$, relations "$t_1=t_2=\ldots t_m$" and "$r_1=r_2=\ldots r_n$" are satisfied.

Further, an antenna weight vector $w_t$ that is set to the amplitude/phase variable circuits 404-1 to 404-$m$ of the transmitter 401 is expressed by the following Formula (4). Furthermore, an antenna weight vector $w_r$ that is set to the amplitude/phase variable circuits 410-1 to 410-$n$ of the receiver 402 is expressed by the following Formula (5).

$$w_t = \begin{bmatrix} \alpha_{t1} e^{i\theta_{t1}} \\ \alpha_{t2} e^{i\theta_{t2}} \\ \vdots \\ \alpha_{tm} e^{i\theta_{tm}} \end{bmatrix} \quad (4)$$

$$w_r = \begin{bmatrix} \alpha_{r1} e^{-i\theta_{r1}} \\ \alpha_{r2} e^{-i\theta_{r2}} \\ \vdots \\ \alpha_{rm} e^{-i\theta_{rm}} \end{bmatrix} \quad (5)$$

By using the definitions of the above-shown Formulas (1) to (5), the signal response of the transmission/reception including the amplitude/phase variable circuits 404-1 to 404-$m$ on the transmission side and the amplitude/phase variable circuits 410-1 to 410-$n$ on the reception side is expressed by Formula (6) shown below. In Formula (6), the matrix $W_t$ is a diagonal matrix that has components of the antenna weight vector $w_t$ on the transmission side as diagonal components. Further, the matrix $W_r^{-1}$ in Formula (6) is the inverse matrix of a diagonal matrix $W_r$ that has components of the antenna weight vector $w_r$ on the reception side as diagonal components. The definitions of the diagonal matrixes $W_t$ and $W_r$ are shown in the following Formulas (7) and (8).

$$R = W_r^{-1} A W_t T \quad (6)$$

$$W_t \equiv \begin{bmatrix} \alpha_{t1} e^{i\theta_{t1}} & 0 & \cdots & 0 \\ 0 & \alpha_{t2} e^{i\theta_{t2}} & \cdots & 0 \\ \vdots & \vdots & \ddots & \vdots \\ 0 & 0 & \cdots & \alpha_{tm} e^{i\theta_{tm}} \end{bmatrix} \quad (7)$$

$$W_r \equiv \begin{bmatrix} \alpha_{r1} e^{-i\theta_{r1}} & 0 & \cdots & 0 \\ 0 & \alpha_{r2} e^{-i\theta_{r2}} & \cdots & 0 \\ \vdots & \vdots & \ddots & \vdots \\ 0 & 0 & \cdots & \alpha_{rm} e^{-i\theta_{rm}} \end{bmatrix} \quad (8)$$

The channel response matrix A can be obtained by performing training while changing the antenna weight vectors $w_t$ and $w_r$. Here, the definition of a correlation matrix is shown in the following Formulas (9) and (10). Note that the index H of the matrix indicates Hermitian transpose.

$$A^H A \quad (9)$$

$$A A^H \quad (10)$$

Letting $\lambda_1, \lambda_2, \ldots, \lambda_{M0}$ stand for eigenvalues of the correlation matrix in Formulas (9) and (10) and letting $\epsilon_{t,i}$ and $\epsilon_{r,i}$ stand for eigenvectors, the channel response matrix A can be decomposed as shown in the following Formula (13). The decomposition process of Formula (13) is called "singular value decomposition (SVD)".

$$E_t = [\epsilon_{t,1}, \epsilon_{t,2}, \ldots, \epsilon_{t,M_0}] \quad (11)$$

$$E_r = [\epsilon_{r,1}, \epsilon_{r,2}, \ldots, \epsilon_{r,M_0}] \quad (12)$$

$$A = E_r D E_t^H = \sum_{i=1}^{M_0} \sqrt{\lambda_i}\, \epsilon_{r,i} \epsilon_{t,i}^H \quad (13)$$

$$D = \begin{bmatrix} \sqrt{\lambda_1} & 0 & \cdots & 0 \\ 0 & \sqrt{\lambda_2} & \cdots & 0 \\ \vdots & \vdots & \ddots & \vdots \\ 0 & 0 & \cdots & \sqrt{\lambda_{M_0}} \end{bmatrix} \quad (14)$$

Note that M0 indicates the smaller one of the number m of the transmission antenna elements and the number n of the reception antenna elements. The eigenvector $\epsilon_{t,i}$ is an eigenvector belonging to the eigenvalue $\lambda_i$ of the symmetric matrix $A^H A$ shown in Formula (9), i.e., m×m Hermitian matrix. $E_t$ is an eigenvector matrix having M0 eigenvectors $\epsilon_{t,i}$ as its components, and is expressed by Formula (11). The eigenvector $\epsilon_{r,i}$ is an eigenvector belonging to the eigenvalue $\lambda_i$ of the symmetric matrix $AA^H$ shown in Formula (10), i.e., n×n Hermitian matrix. $E_r$ is an eigenvector matrix having M0 eigenvectors $\epsilon_{r,i}$ as its components, and is expressed by Formula (12). Further, D is a diagonal matrix having the square roots of the eigenvalues $\lambda_1, \lambda_2, \ldots, \lambda_{M0}$ as diagonal components as shown in Formula (14). Note that each of the square roots of the eigenvalues $\lambda_1, \lambda_2, \lambda_{M0}$ represents the energy of a respective one of M0 eigenpaths. The M0 eigenpaths have no correlation among them.

In this exemplary embodiment in accordance with the present invention, all the diagonal components except for one component of the matrix D in Formula (14) are replaced by zeros. Further, the channel response matrix A is reconstructed by using the matrix $D_i$ in which the components were replaced. For example, when all the diagonal components expect for the second diagonal component are replaced by zeros, the diagonal matrix $D_2$ is expressed by the following Formula (15). Further, the channel response matrix $A_2$ reconstructed by using the matrix $D_2$ is expressed by Formula (16). From this channel response matrix $A_2$, one candidate antenna weight vector can be obtained.

$$D_2 = \begin{bmatrix} 0 & 0 & \cdots & 0 \\ 0 & \sqrt{\lambda_2} & \cdots & 0 \\ \vdots & \vdots & \ddots & \vdots \\ 0 & 0 & \cdots & 0 \end{bmatrix} \quad (15)$$

$$A_2 = E_r D_2 E_t^H = \sqrt{\lambda_2}\, \epsilon_{r,2} \epsilon_{t,2}^H \quad (16)$$

By repeating the above-described procedure, M0 candidate antenna weight vectors, at the maximum, corresponding to the eigenvalues $\lambda_1, \lambda_2, \ldots, \lambda_{M0}$ respectively are obtained. The transmitter 401 and receiver 402 store at least a part of these M0 candidate antenna weight vectors as a data string (database) in the storage circuits 408 and 414. As described previously, the transmitter 401 and receiver 402 select one antenna weight vector from the data string to start communication (S13 and S14 in FIG. 1). Then, when the communication using the optimal antenna weight vector selected in the early stage deteriorates, the transmitter 401 and receiver 402 select the next candidate from this data string (S15 in FIG. 1), validates the communication quality (S16 in FIG. 1), and when the communication quality is satisfactory, adopts that candidate (change from S13 to S14).

Note that the square roots of the eigenvalues $\lambda_1, \lambda_2, \ldots, \lambda_{M0}$ represent the energy of the eigenpaths. Therefore, when the communication starts for the first time in S14 of FIG. 1, it is preferable to select a candidate antenna weight vector corresponding to the largest eigenvalue.

Further, all the diagonal component except for one component of the matrix D shown in Formula (14) are replaced by zeros in the above explanation of the calculation procedure of candidate antenna weight vectors. However, a purpose of this exemplary embodiment is to select one eigenpath and remove the influence by the other eigenpaths. Therefore, it is not indispensable to replace the diagonal components of the matrix D by zeros in the actual calculation process. That is, other mathematically equivalent methods may be used to achieve this purpose.

Figure 6:
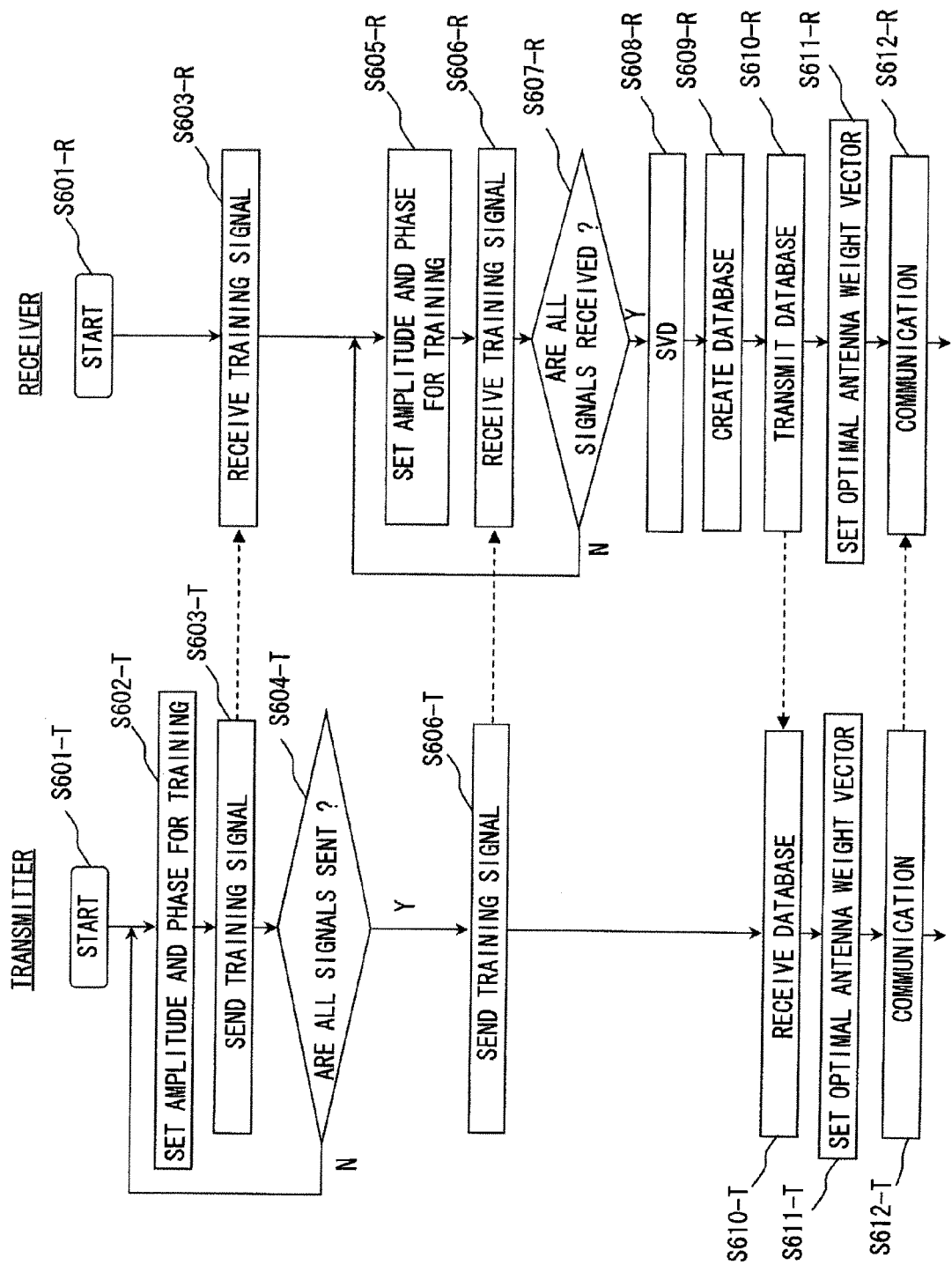
FIG. 6 is a sequence diagram illustrating operations of a transmitter and a receiver that are performed before actual wireless communication in a radio control procedure in accordance with a first exemplary embodiment of the present invention.

Next, operations of the transmitter 401 and receiver 402 performed in the state transition process shown FIG. 1 are explained hereinafter in detail. FIG. 6 is a sequence diagram illustrating operations of the transmitter 401 and receiver 402 performed in the transition process from S11 to S13 of FIG. 1, i.e., in the process from the execution of the initial training to the start of communication. Note that although not illustrated in FIG. 4, it is preferable that the transmitter 401 and receiver 402 operate in synchronization with each other and that a transmission path used to transfer information from the receiver 402 to the transmitter 401 is provided. This transmission path in the reverse direction may be a wireless transmission path or a wired transmission path. Further, in the normal communication, the transmitter 401 sends externally-input data to the receiver 402. On the other hand, in the training, the processing/arithmetic circuit 406 makes the transmitting circuit 403 send a signal for training (hereinafter called "training signal"). As a result, a training signal is transmitted from the transmitter 401 to the receiver 402 in the training.

Hereinafter, each step of the sequence diagram of FIG. 6 is explained one by one. Firstly, the transmitter 401 sets a phase for training of the transmitter 401 in the amplitude/phase variable circuits 404-1 to 404-$m$ (S602-T), and sends a training signal (S603-T). The transmitter 401 repeats the training signal sending process, while changing the setting of the amplitude and phase for the amplitude/phase variable circuits 404-1 to 404-$m$, until the signal sending processes in all of the predetermined amplitude-and-phase settings are completed (S604-T). During this process, the receiver 402 receives the training signal (5603-R). In the receiver 402, which has received the training signal, the receiving circuit 409 measures the received-signal strength and/or the received-signal quality and supplies data indicating the measurement result to the processing/arithmetic circuit 412. The processing/arithmetic circuit 412 processes the data indicating the measurement result.

Next, the transmitter 401 sends a training signal for training the receiver 402 (S606-T). During this process, the receiver 402 sets a phase for training in the amplitude/phase control circuits 410-1 to 410-$n$ (S605-R), and receives the training signal (S606-R). The receiver 402 repeats the training signal receiving process until the signal receiving processes in all of the predetermined amplitude-and-phase settings are completed (S607-R).

In the step S608-R, the processing/arithmetic circuit 412 performs an SVD process by using measurement data obtained in the steps S603-R to S607-R. Further, the processing/arithmetic circuit 412 obtains a plurality of antenna weight vectors (setting of the amplitude and phase of a signal to be applied to the antenna array) in accordance with the previously-described procedure, creates a data string (database) including these candidate antenna weight vectors, and stores the data string to the storage circuit 414 (S609-R). Further, the processing/arithmetic circuit 412 transmits the created database to the transmitter 401 by using the transmission path in the reverse direction (not shown) (S610-T, R). The transmitter 401 stores the received database to the storage circuit 408. At this point, the common contents are stored in both the storage circuits 408 and 414. The transmitter 401 and receiver 402 select an optimal antenna weight vector from the common databases, for example, in the descending order of the eigenvalues (S611-T, R), set an amplitude and phase corresponding to the selected antenna weight vector in the amplitude/phase variable circuits, and start communication (S612-T, R).

Figure 7:
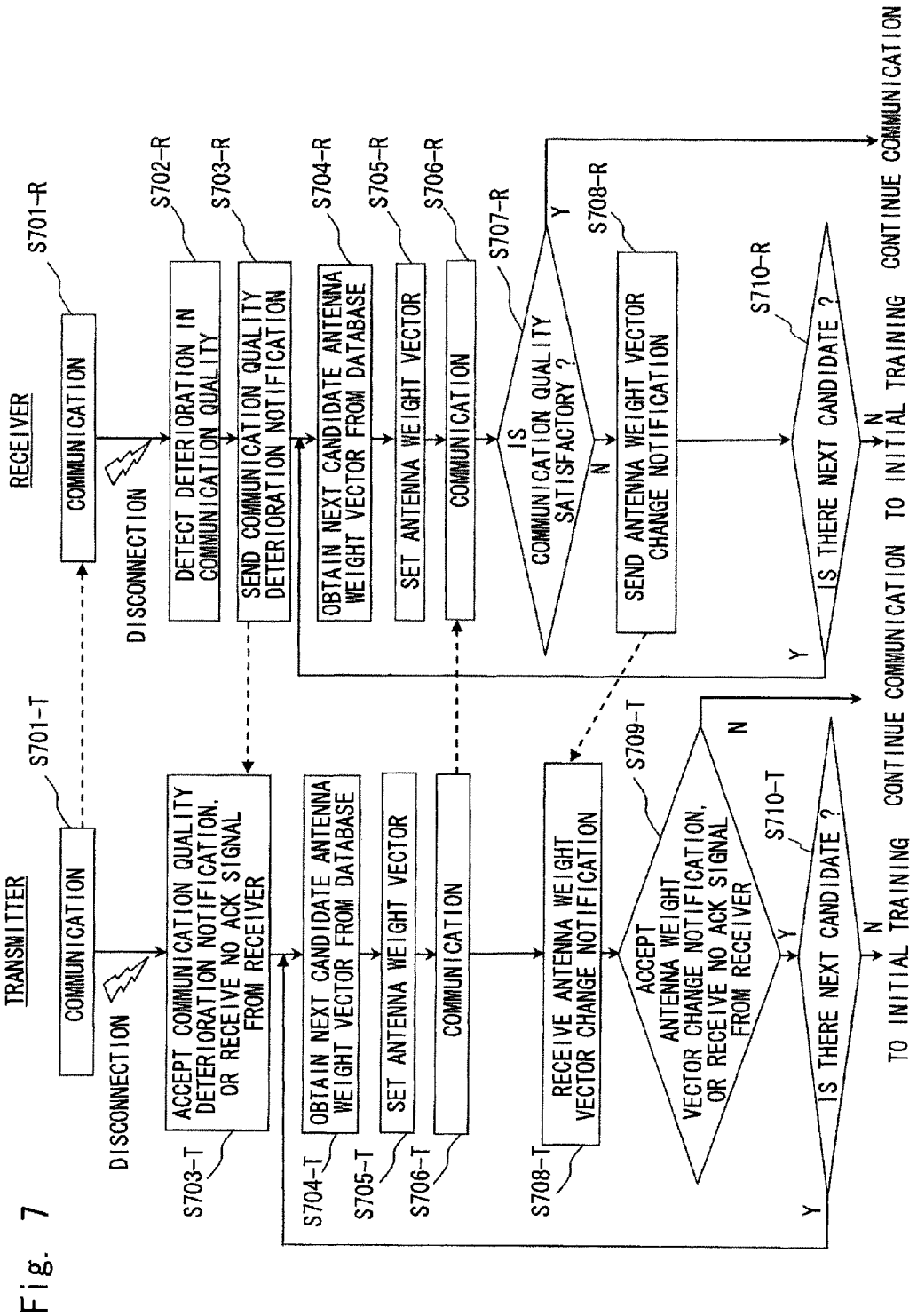
FIG. 7 is a sequence diagram illustrating operations of a transmitter and a receiver that are performed when the wireless communication is shielded in a radio control procedure in accordance with a first exemplary embodiment of the present invention.

Next, an operation performed when deterioration in the communication quality such as disconnected communication occurs is explained with reference to FIG. 7. FIG. 7 is a sequence diagram illustrating operations of the transmitter 401 and receiver 402 in the transition process from S14 to S16 of FIG. 1.

When a trouble such as disconnected communication occurs, the receiver 402 detects deterioration in the communication quality (S702-R), and notifies it to the transmitter 401 (S703-R). The transmitter 401 receives the notification of the communication quality deterioration from the receiver 402. Alternatively, the transmitter 401 recognizes disconnected communication (or deteriorated communication state) base on the fact that an ACK signal, which would be transmitted from the receiver 402 upon successful reception of data under normal communication circumstances, is not received. In this state, each of the transmitter 401 and receiver 402 obtains the next candidate antenna weight vector from their own common databases (S704-T, R).

In a step S705-T, the transmitter 401 sets the next candidate antenna weight vector in the amplitude/phase control circuits 404-1 to 404-$m$. Similarly, in a step S705-T, the receiver 402 sets the next candidate antenna weight vector in the amplitude/phase control circuits 410-1 to 410-$n$. After that, the transmitter 401 and receiver 402 resume the communication (S706-T, R). After the communication is resumed, the receiver 402 verifies the communication quality (S707-R). When the communication quality is satisfactory, the communication is continued, whereas when it is unsatisfactory, the receiver 402 sends a notification indicating a combination change (S708-R). The transmitter 401 continues the communication unless the transmitter 401 receives a notification indicating a combination change, or unless the transmitter 401 cannot receive an ACK signal from the receiver (S709-T). If not so, the transmitter 401 and receiver 402 attempt to communicate by using the next candidate antenna weight vector as long as there is another candidate (S710-T, R). If the communication quality cannot be improved with any of candidate antenna weight vector combinations recorded in the storage circuits 408 and 414 and hence there is no available candidate, the transmitter 401 and receiver 402 return to the initial training.

Incidentally, although the training in the transmitter 401 precedes the training in the receiver 402 in the exemplary embodiment shown in FIG. 6, the training in the receiver 402 may be performed before the training in the transmitter 401. Further, although the SVD calculation (S608-R) and the database creation (S609-R) are performed in the receiver 402 in the exemplary embodiment in FIG. 6, at least one of them may be performed in the transmitter 401. Specifically, received data or SVD result data may be transferred from the receiver 402 to the transmitter 401, and the processing/arithmetic circuit 406 may perform calculation using these data. Further, as for the database creation, other cases where antenna weight vectors obtained by a method other than the method described in this specification are added in the database also fall within the scope of this exemplary embodiment.

In accordance with this exemplary embodiment, when deterioration in the communication quality such as disconnected wireless communication or the like occurs, communication can be swiftly resumed by selecting another candidate antenna weight vector that is generated in advance. In other words, since it is unnecessary to perform training and SVD calculation again every time deterioration in the communication quality occurs in this exemplary embodiment, it is possible to determine a new beam in a very short time. Note that, in general, the SVD requires a large quantity of calculation, and therefore even in this exemplary embodiment, it is necessary to perform SVD calculation in the initial training in order to establish a link. However, a longer processing time is acceptable for the initial training in comparison to the situation where the communication is recovered after the occurrence of disconnected communication, and thus causing little or no problem.

The following is supplementary explanation for the reason why this method is effective for millimeter waves used indoors, or microwaves having a frequency around or higher than 10 GHz and thus having a high rectilinear propagation property. The propagation paths that can be used for wireless communication are limited. That is, only the direct wave and reflected waves from certain objects such as walls, windows, and furniture can be used. Therefore, angles at which waves should be emitted or angles at which waves should be received are different from one wave to another. Meanwhile, when subcarriers having a low rectilinear propagation property such as 2.4 GHz micro waveband are used, it is necessary to give consideration to effects caused by multiple scattering and diffraction, and thus, in general, directional antennas are not used. Therefore, situations are different between communication using microwaves and millimeter waves having a frequency around or higher than 10 GHz and communication using microwaves in the order of 2.4 GHz. Note that there are some examples of development of adaptive antennas having directivity for the purpose of removing interference even in the field of communication using 2.4 GHz microwaves. However, even if an adaptive-type directional antenna is used, it is relatively easy to ensure satisfactory communication quality at the angle of the direct wave or angles close to it in the 2.4 GHz band because diffraction effects can be expected.

As for the indoor communication using beam forming in the millimeter waveband, it is necessary to take the following characteristics into consideration. As described previously, the number of reflected waves other than the direct wave is limited. Further, even if a certain direct wave or a reflected wave is shielded by an obstacle (e.g., human body), there is no correlation between the shielded wave and other waves. Therefore, in the millimeter wave communication system, as described in this exemplary embodiment, it is possible to obtain a reserve beam direction while performing communication in a beam direction having the best communication state. In contrast to this, when the frequency is lower than around 10 GHz, contribution of multiple reflections and diffractions to the communication quality is large. Therefore, even if a directional antenna is used, the propagation state of the reserve beam direction varies depending on the presence/absence of an obstacle. That is, there is a high possibility that the received signal state of the reserve beam direction, which has satisfactory quality without any obstacle, is changed due to the presence of an obstacle. Therefore, it is difficult to obtain the advantageous effect of the present invention in 2.4 GHz microwave communication and the like.

Figure 8A:
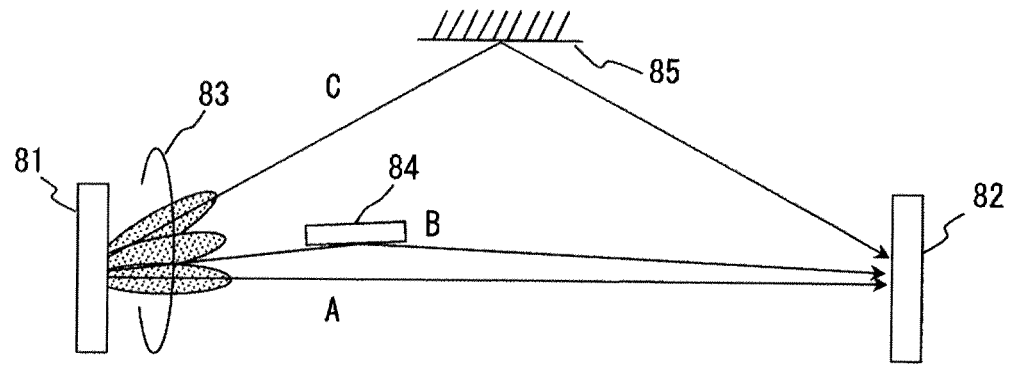
FIG. 8A shows a figure for illustrating an aspect of radio-wave propagation in a case where propagation paths are created by local reflections of the radio signal in a radio control procedure in accordance with a first exemplary embodiment of the present invention (when no shielding occurs)
Figure 8B:
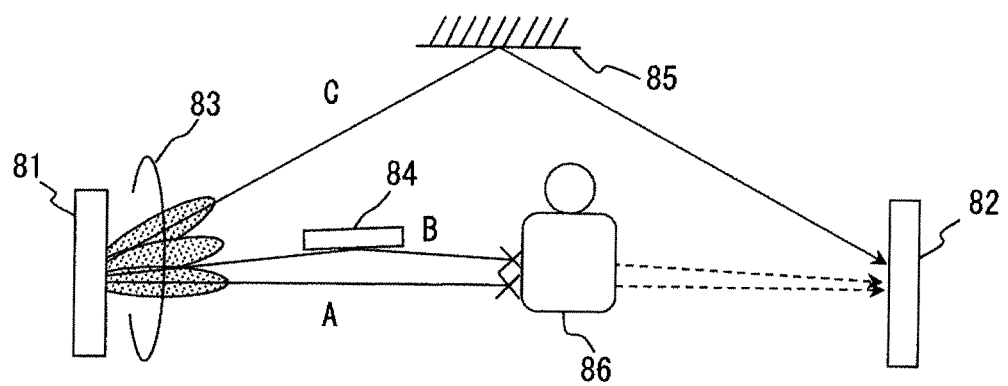
FIG. 8B shows a figure for illustrating an aspect of radio-wave propagation in a case where propagation paths are created by local reflections of the radio signal in a radio control procedure in accordance with a first exemplary embodiment of the present invention (when shielding occurs by a human body)
Figure 9:
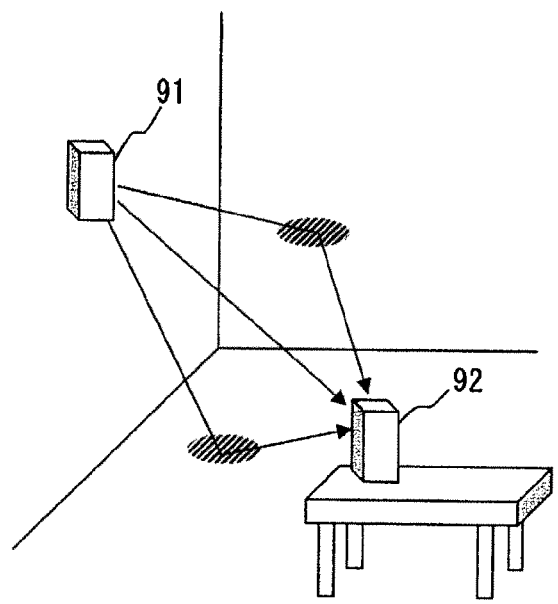
FIG. 9 shows a configuration of a system using wide-angel antennas.
Figure 10:
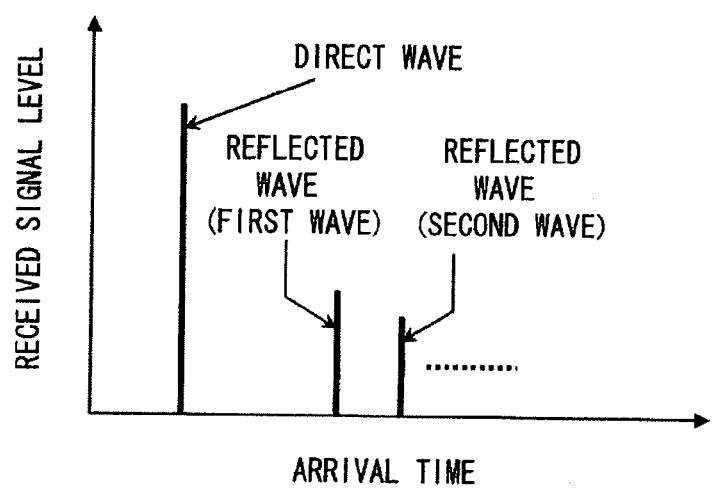
FIG. 10 shows an example of a delay profile of a system using wide-angle antennas when the system is used indoors.

Further, in millimeter wave communication, a propagation path may be sometimes created by local reflection. FIGS. 8A and 8B show aspects of such a situation. In FIG. 8A, there are a transceiver 81 and a receiver 82, and it is assumed that there are propagation paths in the beam forming including a direct wave A, a local reflected wave B, and a reflected wave C propagating through a long path. As shown in FIG. 8B, there is a possibility that the direct wave A and the local reflected wave B are simultaneously shielded, for example, by a human body. When there is a high correlation between the propagation path A (direct wave A) and the propagation path B (reflected wave B), they are not decomposed by SVD. Therefore, the same antenna weight vector is applied to the propagation paths A and B. Therefore, it is possible to eliminate candidate antenna weight vectors that are simultaneously shielded in this exemplary embodiment. However, when the correlation between the propagation paths A and B is low, they could become different candidate antenna weight vectors. However, even in such a case, the only necessary process to be added is to perform one extra repetition of the steps (S704-T, R) to (S710-T, R). Therefore, the time required for the recovery of the communication can be still significantly reduced in comparison to the case where the training itself is performed again.

Second Exemplary Embodiment

A second exemplary embodiment of the present invention is explained with reference to a transition diagram shown in FIG. 2. Note that the wireless communication system in accordance with this exemplary embodiment may employ a similar configuration to that shown in FIG. 4. Each state from S21 to S26 shown in FIG. 2 as well as their transition conditions are similar to those described in the first exemplary embodiment and shown as S11 to S16 in FIG. 1. Therefore, detailed explanations of S21 to S26 are omitted.

Figure 2:
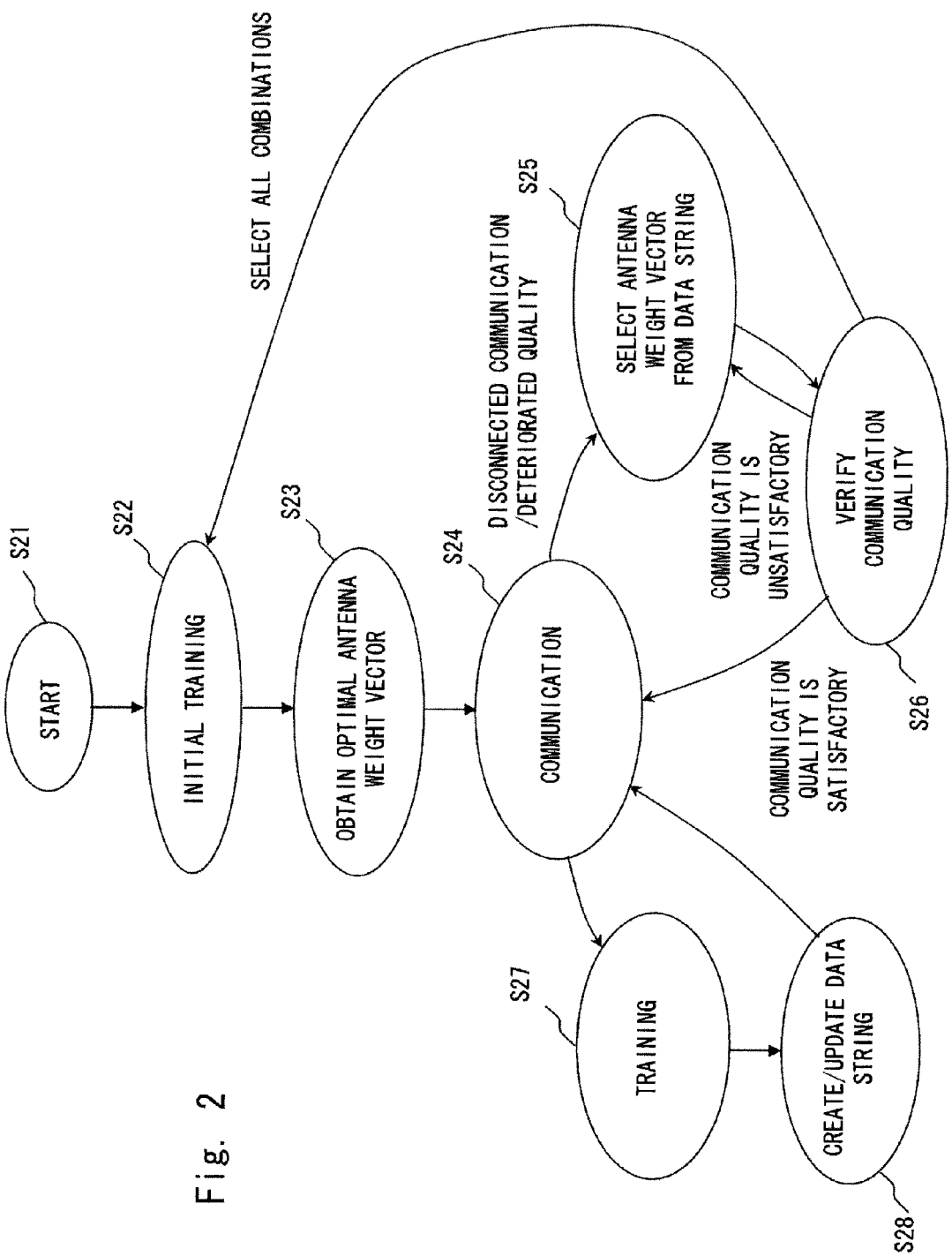
FIG. 2 shows transitions in a radio control procedure in accordance with a second exemplary embodiment of the present invention.

In S27 of FIG. 2, the processing state is changed from the communication continuation state (S24) to perform an additional second training. The second training may be performed at regular intervals, or may be performed during idle times in which no data is transmitted/received.

In S28, the processing/arithmetic circuit 406 or 412, or both of them in cooperation re-calculate a plurality of candidate antenna weight vectors. The processing/arithmetic circuits 406 and 412 update the data string stored in the storage circuits 408 and 414 with the plurality of candidate antenna weight vectors obtained by the recalculation.

In this exemplary embodiment, the plurality of candidate antenna weight vectors are updated by examining the situation in regard to the reserve beam direction by performing the second training at regular intervals or as necessary. In this way, the wireless communication system in accordance with this exemplary embodiment can obtain the latest candidate antenna weight vectors at all times. Note that the second training (S27) may be divided into multiple sections so that they can be performed in intervals of the communication. In this way, there is no need to suspend the communication for a long time. Further, when the communication is disconnected or the communication quality deteriorates, it is desirable to restore the communication in a very short time. However, since so much immediacy is not required for the second training, SVD and the like can be performed without causing any substantial problem.

Third Exemplary Embodiment

Figure 3:
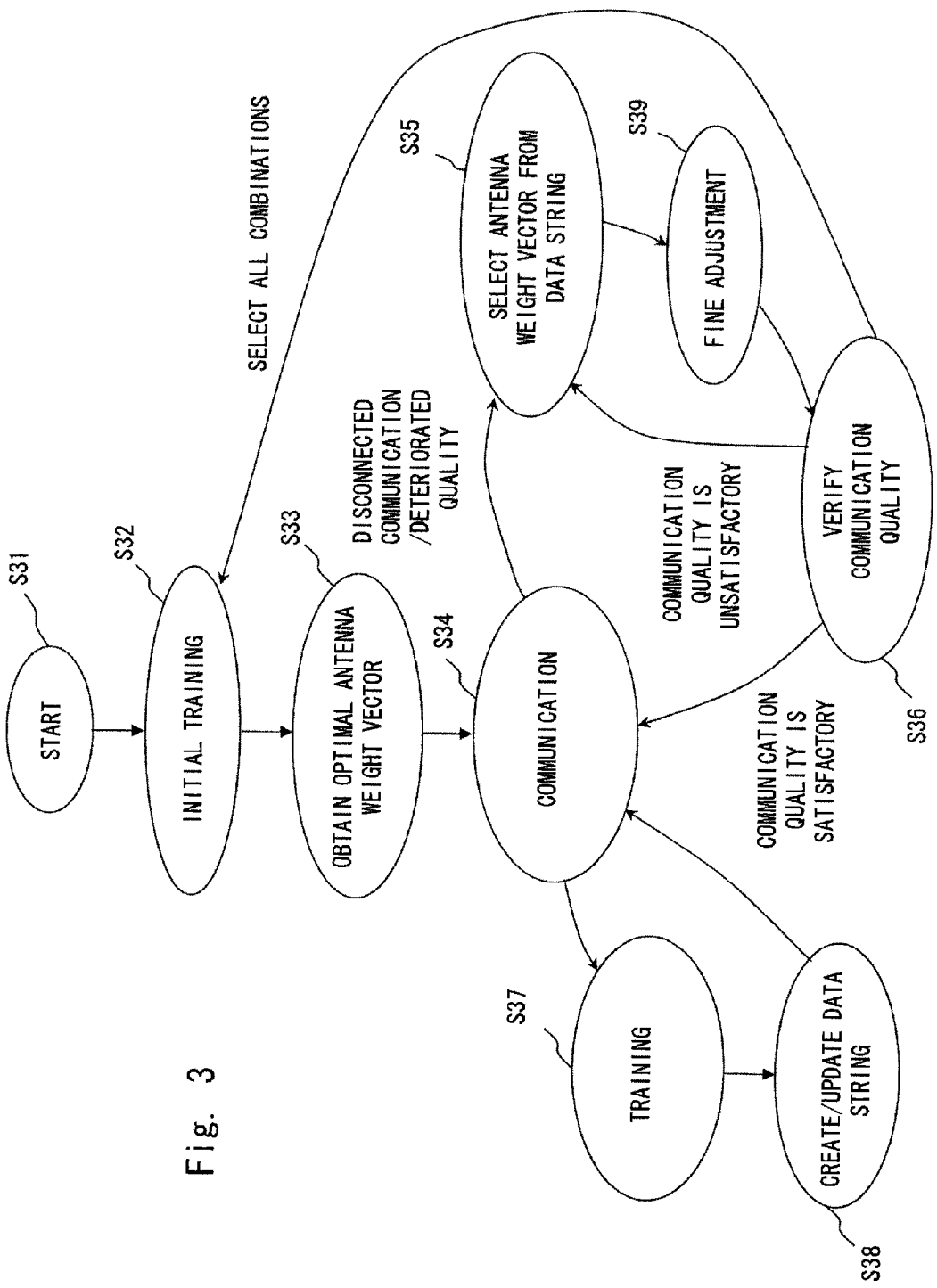
FIG. 3 shows transitions in a radio control procedure in accordance with a third exemplary embodiment of the present invention.

A third exemplary embodiment of the present invention is explained with reference to a transition diagram shown in FIG. 3. The wireless communication system in accordance with this exemplary embodiment may employ a similar configuration to that shown in FIG. 4. Further, the wireless communication system in accordance with third exemplary embodiment performs the same operations as those of the second exemplary embodiment. That is, each state from S31 to S38 shown in FIG. 3 as well as their transition conditions are similar to those described in the second exemplary embodiment and shown as S21 to S28 in FIG. 2. Therefore, detailed explanations of S31 to S38 are omitted.

In this exemplary embodiment, when deterioration in the communication quality such as disconnected communication or the like occurs, the next candidate antenna weight vector is selected from the plurality of candidates recorded in the database (S35) and a fine adjustment is performed in that state (S39). This fine adjustment means a method for searching for an optimal beam without taking much time. Specifically, the adjustment may be performed by slightly changing the beam or the set phase so that better communication quality is obtained. Furthermore, simplified beam searching procedure such as "Beam Tracking" disclosed in Patent literature 3 may be applied.

For example, in the case where the candidate antenna weight vector is changed in order from an antenna weight vector corresponding to a large eigenvalue to an antenna weight vector corresponding to a small eigenvalue as described in detail in the first exemplary embodiment, the received power gradually decreases and the accuracy could gradually deteriorate. Accordingly, it can provide such an advantageous effect that an antenna weight vector with which stable transmission can be achieved with high accuracy can be found by performing the fine adjustment, e.g. adjusting a receiving antenna gain, where the received power is weakened by the occurrence of shielding.

Fourth Exemplary Embodiment

A fourth exemplary embodiment is characterized in that the training and the acquisition/setting of antenna weight vectors are performed at a low rate (with a narrow band) and actual communication is performed at a relatively high rate (with a wide band). For the other operations, the method described in one of first to third exemplary embodiments may be employed.

Since the free space propagation loss is large in millimeter wave communication, the received power is expected to be small. Therefore, if a unitary matrix is set as antenna weight vectors of the amplitude/phase variable circuits 404-1 to 404-$m$ or 410-1 to 410-$n$, there is a possibility that a sufficient CNR (Carrier to Noise Ratio) is not achieved. Accordingly, it is expected that the use of the low rate (narrow band) having better reception sensitivity provides advantageous effects such as enabling the training and improving the accuracy. Note that the use of low rate (narrow band) means to narrow the frequency band used to transmit a training signal in order to narrow the noise bandwidth, or to adopt a modulation technique having a small necessary CNR. Note also that "to adopt a modulation technique having a small necessary CNR" means, in other words, to adopt a modulation technique having a large distance between signal points on the constellation (typically a smaller transmission rate). Note also that it is assumed that a narrow beam width is used in this exemplary embodiment, and therefore there is no significant difference in optimal beam (or corresponding antenna weight vector) regardless of whether the transmission is a low rate (narrow band) or a high rate (wide band) because the correlative bandwidth is wide.

In the above four exemplary embodiments, the term "communication quality" is used. The communication quality may be, for example, any parameter representing communication quality such as a received-signal level, an SNR (Signal to Noise Ratio), a BER (Bit Error Rate), a PER (Packet Error Rate), and a FER (Frame Error Rate), and one or more than one of them may be used. Further, a certain data string in a preamble included in a transmission data string of the transmitter 401 may be used for the evaluation of communication quality.

Further, the amplitude/phase variable circuits 404-1 to 404-$m$ or 410-1 to 410-$n$ are used in the above-described four exemplary embodiments. However, the essential purpose is to realize desired antenna weight vectors, and it can be constructed by using any appropriate circuits.

Furthermore, although the transmitter 401 and receiver 402 are described as separate devices in the explanation of the above-described four exemplary embodiments, needless to say, the present invention can be also applied to communication between transmission-and-reception devices each having a transmitting function and a receiving function. In such a case, if the single-piece transmission-and-reception antenna is used, the training needs to be performed only in one of the two directions of the radio transmission path because of the principle of reciprocity.

Incidentally, control and arithmetic processing for the generation/switching of a plurality of candidate antenna weight vectors that are performed by the transmitter 401 in the above-described first to fifth exemplary embodiments can be also implemented by executing a computer program(s) for transmitter/receiver control in a computer such as a microprocessor. In the case of the first exemplary embodiment, for example, processing in the steps S703-T to S705-T and S708-T to S710-T shown in the flowchart of FIG. 7 may be performed in a computer executing a transmitter control program. Similarly, control and arithmetic processing for the generation/switching of a plurality of candidate antenna weight vectors that are performed in the receiver 402 can be also implemented by executing a computer program(s) for transmission/reception control in a computer such as a microprocessor. In the case of the first exemplary embodiment, for example, processing in the steps S702-R to S705-R and S707-R to S710-R shown in the flowchart of FIG. 7 may be performed in a computer executing a receiver control program. These transmitter control program and receiver control program can be stored in various types of computer-accessible storage media. Further, these programs can be also transmitted through communication media. Note that examples of the storage media include a flexible disk, a hard disk, a magnetic disk, magneto-optic disk, a CD-ROM, a DVD, a ROM cartridge, a RAM memory cartridge with a battery backup, a flash memory cartridge, and a nonvolatile RAM cartridge. Further, examples of the communication media include a wire communication medium such as a telephone line, a wireless communication medium such as a microwave line, and the Internet.

Furthermore, in addition to the processing/arithmetic circuits 406 and 412, a part of the transmitting circuit 403 (modulation processing and the like), a part of the receiving circuit 409 (demodulation processing and the like), and other components for digital signal processing or device control such as the control circuit 407 and control circuit 413 may be implemented by a computer such as a microcomputer and a DSP (Digital Signal Processor). Furthermore, the so-called "software-antenna technology" may be applied to the transmitter 401 and receiver 402. Specifically, the amplitude/phase variable circuits 404-1 to 404-*m* and 410-1 to 410-*n* may be constructed by a digital filter(s), or a computer such as a DSP.

Further, the present invention is not limited to the above-described exemplary embodiments, and needless to say, various modifications can be made without departing from the above-described spirit of the present invention.

| Reference Signs List | |
|---|---|
| 401, 81, 91 | TRANSMITTER |
| 402, 82, 92 | RECEIVER |
| 403 | TRANSMITTING CIRCUIT |
| 404-1~m | AMPLITUDE/PHASE VARIABLE CIRCUIT |
| 405-1~m | TRANSMITTING ANTENNAL ARRAY |
| 406 | PROCESSING/ARITHMETIC CIRCUIT |
| 407 | CONTROL CIRCUIT |
| 408 | STORAGE CIRCUIT |
| 409 | RECEIVING CIRCUIT |
| 410-1~n | AMPLITUDE/PHASE VARIABLE CIRCUIT |
| 411-1~n | RECEIVING ANTENNAL ARRAY |
| 412 | PROCESSING/ARITHMETIC CIRCUIT |
| 413 | CONTROL CIRCUIT |
| 414 | STORAGE CIRCUIT |
| 83 | BEAM PATTERN (IMAGE) |
| 84, 85 | REFLECTOR |
| 86 | HUMAN BODY |

The invention claimed is:

1. A method of controlling a wireless communication system which comprises a transmitter comprising a transmitting antenna array and a receiver comprising a receiving antenna array,
wherein when amplitudes and phases of signals to be transmitted from at least two antenna elements among a plurality of antenna elements constituting the transmitting antenna array are independently controlled and amplitudes and phases of signals to be received at least two antenna elements among a plurality of antenna elements constituting the receiving antenna array are independently controlled, the method comprises:
obtaining a channel response matrix by performing a training process to obtain an optimal setting of amplitudes and phases of signals to be applied to the antenna array (hereinafter called "antenna weight vector") at least between the transmitter and the receiver;
performing singular-value decomposition process to decompose the channel response matrix into a correlation matrix and eigenvalues;
obtaining a diagonal matrix having square roots of the eigenvalues obtained in the singular-value decomposition process as its components; and
replacing all but one of diagonal components included in the diagonal matrix with zeros, and obtaining an antenna weight vector to be applied to the antenna array for use in wireless communication between the transmitter and the receiver based on channel response matrix reconstructed by using the component-replaced diagonal matrix.

2. The method of controlling a wireless communication system according to claim 1, wherein when the antenna weight vector to be applied to the antennal array is obtained, the method further comprises:
obtaining a plurality of reconstructed channel response matrixes; and
individually obtaining an antenna weight vector to be applied to the antenna array for each of the plurality of reconstructed channel response matrixes based on the reconstructed channel response matrixes, and using one of the plurality of individually-obtained antenna weight vectors as the optimal antenna weight vector to be applied to the antenna array.

3. The method of controlling a wireless communication system according to claim 2, further comprising assigning priority ranks to the antenna weight vectors, which were individually obtained for each of the plurality of reconstructed channel response matrixes, in descending order of magnitude of the diagonal components, selecting an antenna weight vector to be applied to the antenna array of the transmitter and the antenna array of the receiver according to the priority ranks, and performing wireless communication by using the selected antenna weight vector.

4. The method of controlling a wireless communication system according to claim 3, further comprising selecting an antenna weight vector according to the priority ranks in response to deterioration in communication quality between the transmitter and the receiver, and performing wireless communication by applying the selected antenna weight vector.

5. The method of controlling a wireless communication system according to claim 1, wherein a first radio wave used to carry a training signal sent from the transmitter to the receiver for the training process has a narrower transmission frequency band than that of a second radio wave used for transmission of an information signal that is performed by applying the optimal antenna weight vector to be applied to the antenna array, or the first radio wave is modulated by a modulation method having a larger distance between signal points than that of the second radio wave.

6. A wireless communication system comprises:
a transmitter comprising a transmitting antenna array comprising a plurality of transmitting antennal components, the transmitter being configured to independently control amplitudes and phases of transmission signals to be transmitted from at least two antenna elements among the plurality of antenna elements; and
a receiver comprising a receiving antenna array comprising a plurality of receiving antennal components, the receiver being configured to independently control amplitudes and phases of received signals to be received at least two antenna elements among the plurality of antenna elements constituting the receiving antenna array, wherein
the transmitter and the receiver are configured so as to perform an amplitude/phase control process of the transmitting and receiving antenna arrays in cooperation, the amplitude/phase control process comprises:
obtaining a channel response matrix by performing a training to obtain an optimal antenna weight vector to be applied to the antenna array at least between the transmitter and the receiver;
performing singular value decomposition to decompose the channel response matrix into a correlation matrix and eigenvalues;
obtaining a diagonal matrix having square roots of the eigenvalues obtained by the singular-value decomposition as its components;
obtaining an antenna weight vector to be applied to the antenna array for use in wireless communication between the transmitter and the receiver based on a channel response matrix reconstructed by using a component-replaced diagonal matrix, the component-replaced diagonal matrix being obtained by replacing all but one of diagonal components included in the diagonal matrix with zeros; and controlling amplitudes and phases of the transmission signals and received signals in accordance with the antenna weight vector.

7. The wireless communication system according to claim 6, wherein said obtaining the antenna weight vector to be applied to the antennal array comprises:
   obtaining a plurality of reconstructed channel response matrixes;
   obtaining individually an antenna weight vector to be applied to the antenna array for each of these plurality of reconstructed channel response matrixes based on the reconstructed channel response matrixes; and
   using one of the plurality of individually-obtained antenna weight vectors as the optimal antenna weight vector to be applied to the antenna array.

8. The wireless communication system according to claim 7, wherein the amplitude/phase control process further comprises:
   storing the plurality of antenna weight vectors, which were individually obtained for each of the plurality of reconstructed channel response matrixes, as a data string;
   obtaining a new channel response matrix by performing the training at least either at predetermined intervals or at random timing during communication between the transmitter and the receiver; and
   updating the data string according to timing of a calculation of the new channel response matrix.

9. The wireless communication system according to claim 7, wherein the amplitude/phase control process further comprises:
   assigning priority ranks to the antenna weight vectors, which were individually obtained for each of the plurality of reconstructed channel response matrixes, in descending order of magnitude of the diagonal components;
   selecting an antenna weight vector to be applied to the transmitting antenna array and the receiving antenna array according to the priority ranks; and
   performing wireless communication by using the selected antenna weight vector.

10. The wireless communication system according to claim 9, wherein said selecting the antenna weight vector is performed in response to deterioration in communication quality between the transmitter and the receiver.

11. The wireless communication system according to claim 6, wherein a first radio wave used to carry a training signal sent from the transmitter to the receiver for the training process has a narrower transmission frequency band than that of a second radio wave used for transmission of an information signal that is performed by applying the optimal antenna weight vector to be applied to the antenna array, or the first radio wave is modulated by a modulation method having a larger distance between signal points than that of the second radio wave.

12. The wireless communication system according to claim 6, wherein a radio wave having a frequency equal to or higher than 10 GHz is used for the wireless communication.

13. A wireless communication system comprises:
    a transmitter comprising a transmitting antenna array comprising a plurality of transmitting antennal components, the transmitter being configured to independently control amplitudes and phases of transmission signals to be transmitted from at least two antenna elements among the plurality of antenna elements;
    a receiver comprising a receiving antenna array comprising a plurality of receiving antennal components, the receiver being configured to independently control amplitudes and phases of received signals to be received at least two antenna elements among the plurality of antenna elements constituting the receiving antenna array,
    channel response matrix calculation means for obtaining a channel response matrix by performing a training to obtain an optimal antenna weight vector to be applied to the antenna array at least between the transmitter and the receiver;
    singular-value decomposition means for decomposing the channel response matrix into a correlation matrix and eigenvalues; and
    amplitude/phase control means for obtaining a diagonal matrix having square roots of the eigenvalues obtained by the singular-value decomposition means as its components, replacing all but one of diagonal components included in the diagonal matrix with zeros, obtaining an antenna weight vector to be applied to the antenna array for use in wireless communication between the transmitter and the receiver based on a channel response matrix reconstructed by using the component-replaced diagonal matrix, and controlling amplitudes and phases of the transmission signals and received signals in accordance with its result.

* * * * *